(12) United States Patent
Mehta

(10) Patent No.: US 11,580,477 B2
(45) Date of Patent: *Feb. 14, 2023

(54) METHOD AND SYSTEM FOR MANAGING RESEARCH AND DEVELOPMENT IN AN ENTERPRISE

(71) Applicant: InspiRD, Inc., Mission Viejo, CA (US)

(72) Inventor: Sandeep Mehta, Redondo Beach, CA (US)

(73) Assignee: InspiRD, Inc.

( * ) Notice: Subject to any disclaimer, the term of this patent is extended or adjusted under 35 U.S.C. 154(b) by 101 days.

This patent is subject to a terminal disclaimer.

(21) Appl. No.: 16/792,883

(22) Filed: Feb. 17, 2020

(65) Prior Publication Data

US 2020/0184392 A1 Jun. 11, 2020

Related U.S. Application Data

(63) Continuation of application No. 14/086,514, filed on Nov. 21, 2013, now Pat. No. 10,586,194, which is a continuation-in-part of application No. 12/283,121, filed on Sep. 9, 2008, now Pat. No. 8,620,702.

(51) Int. Cl.
| | |
|---|---|
| *G06Q 10/06* | (2012.01) |
| *G06Q 50/16* | (2012.01) |
| *G06Q 10/0637* | (2023.01) |
| *G06Q 10/0635* | (2023.01) |
| *G06Q 10/0639* | (2023.01) |
| *G06Q 50/18* | (2012.01) |
| *G06Q 10/0631* | (2023.01) |

(52) U.S. Cl.
CPC ......... *G06Q 10/0637* (2013.01); *G06Q 10/06* (2013.01); *G06Q 10/0631* (2013.01); *G06Q 10/0635* (2013.01); *G06Q 10/0639* (2013.01); *G06Q 50/184* (2013.01)

(58) Field of Classification Search
CPC .............. G06Q 10/0637; G06Q 10/06; G06Q 10/0631; G06Q 10/0635; G06Q 10/0639; G06Q 50/184
See application file for complete search history.

(56) References Cited

U.S. PATENT DOCUMENTS

| | | | |
|---|---|---|---|
| 7,069,229 B1 | 6/2006 | Richardson et al. | |
| 8,620,702 B2 * | 12/2013 | Mehta | G06Q 10/0635 705/28 |
| 2001/0034632 A1 | 10/2001 | Wilkinson | |
| 2008/0163156 A1 | 7/2008 | Grey | |

* cited by examiner

*Primary Examiner* — Paul Danneman
(74) *Attorney, Agent, or Firm* — Mahesh Law Group PC; Kumar Maheshwari

(57) ABSTRACT

A method and system for capturing research decision flow in a Research and Development (R&D) activity are provided. The method includes defining an objective of the R&D activity and determining one or more requirements for fulfilling the objective of the R&D activity. Further, the method includes identifying a set of risks associated with failure to satisfy the one or more requirements. Furthermore, the method also includes defining a set of tests to verify that the requirements are satisfied or the risks have been mitigated. Furthermore, the method also includes developing a task plan to satisfy the one or more requirements and mitigate one or more risks of the set of risks. Furthermore, the method also includes linking the objective, the one or more requirements, the set of risks and the task plan, to generate a linked information record.

20 Claims, 8 Drawing Sheets

METHOD AND SYSTEM FOR MANAGING RESEARCH AND DEVELOPMENT IN AN ENTERPRISE

CROSS-REFERENCE TO RELATED APPLICATIONS

This application is a continuation of Non-Provisional application Ser. No. 14/086,514 titled "Method and System for Research and Development Management in an Enterprise" filed on Nov. 21, 2013, which was a continuation-in-part of U.S. Non-Provisional patent application Ser. No. 12/283,121 titled "Method and System for Research and Development Management in an Enterprise" filed on Sep. 9, 2008.

FIELD OF THE INVENTION

The invention relates generally to the field of Research and Development (R&D) management in an enterprise. More specifically, the invention relates to a method and system for managing R&D activities in an enterprise through exhaustive knowledge capture and sharing across divisions.

BACKGROUND OF THE INVENTION

With the world economy getting increasingly globalized, competition in markets is growing at a tremendous rate. To survive in such an environment, organizations need to evolve continuously. One of the ways for organizations to evolve is through Research & Development (R&D). R&D of new technologies and products is one of the most critical success factors in modern business. R&D helps organizations compete better by lowering costs of existing products, developing new and improved products or wholly revolutionizing a product category. Given the importance of R&D, the need to ensure that the R&D effort delivers on time becomes very critical. Hence, the organizations engaged in R&D must devise ways and means to organize and manage R&D activities.

What makes management of R&D challenging are its distinctive characteristics. R&D differs from other activities as it is based primarily on knowledge and understanding. Since different divisions of an enterprise are involved in R&D, effective transfer of knowledge is required between them. This transfer of knowledge requires a process to capture the knowledge in the first place. This capture of knowledge is hindered due to the lack of a common language across divisions that participate in R&D. Since every division talks in a different jargon, no effective means exist for transferring knowledge and understanding between divisions. Currently, most knowledge capture and transfer in R&D is ad-hoc through extensive documentation. However, it is very difficult to understand the context and rationale behind an R&D activity from these large documents. Also, often during the course of a project, some team members leave and new people join. The existing systems are unable to provide an effective way of transferring knowledge to the new people. Hence, this phenomenon often results in redundant effort and delay in the schedule.

Another factor that makes management of R&D challenging is the lack of visibility into the progress and needs of various projects. Many R&D projects are large efforts—taking multiple years and involving a large number of engineers. Such R&D projects are sub-divided into subprojects, each delivering a component of the overall product under development. It is even harder to get visibility into progress and needs of such large projects. A key reason for this is that the R&D management tools are disparate and fragmented across divisions. This fragmented information gives an incomplete and inaccurate picture of the progress. Further, even when links exist between such fragmented tools, it is very difficult to aggregate or segregate information for management purposes. Specifically, the tools to manage investments across diverse projects and technologies are undeveloped and require extensive manual labor. Further, metrics do not exist to aggregate R&D activity information to allow management to identify trends and measure performance. Very few metrics exist to analyze investment needs and determine investments across diverse R&D projects. This results in a lot of decisions, such as R&D planning and investment decisions, to be based on imprecise information or what is called "gut feelings." This can often result in unnecessary delays in a project. In a typical organization engaged in R&D, the R&D division works on a multitude of projects simultaneously. A delay in one project has significant impact on the other projects and on the overall R&D schedule. Similarly, R&D project execution is normally distributed across multiple organizations and metrics do not exist to aggregate information and enable managers to make decisions.

In light of the above, there exists a need for an efficient R&D management system. The system should be capable of capturing knowledge across divisions by overcoming the different jargons. Further, the system should span across the divisions in an enterprise to enable effective sharing of information providing better visibility into the whole R&D process.

SUMMARY

An embodiment of the invention provides a method for capturing research decision flow in a Research and Development (R&D) activity. The method includes defining an objective of the R&D activity and determining one or more requirements for fulfilling the objective of the R&D activity. Further, the method includes identifying a set of risks associated with failure to satisfy the one or more requirements. Further, the method includes determining a set of test to verify that requirements are satisfied or risks are mitigated. Further, the method also includes developing a task plan to satisfy the one or more requirements and mitigate one or more risks of the set of risks or conduct the one or more tests. Furthermore, the method also includes linking the objective, the one or more requirements, the set of risks, the set of tests and the task plan to generate a linked information record.

Another embodiment of the invention provides a method for managing Research and Development (R&D) activities in an enterprise. The enterprise includes one or more sub-divisions and the one or more sub-divisions include one or more members. The method includes capturing research decision flow in the R&D activities. Capturing research decision flow includes inputting an objective of each R&D activity of the R&D activities. Further, capturing research decision flow includes inputting one or more requirements. The one or more requirements are determined for fulfilling the objective of each R&D activity. Furthermore, capturing research decision flow includes inputting a set of risks. The set of risks are based on failure to satisfy the one or more requirements. Furthermore, capturing research decision flow includes inputting a set of tests. The set of tests to verify that requirements are satisfied or risks are mitigated. Moreover, capturing research decision flow includes inputting a task plan. The task plan is developed to satisfy the one or more requirements, mitigate one or more risks of the set of risks or conduct one or more tests of the set of tests. The method further includes capturing a set of task information associated with one or more tasks performed by the one or more members. The one or more tasks are related to the R&D activities. Furthermore, the method includes linking the inputted objective, the one or more requirements, the set of risks, the set of tests and the task plan and the set of task information, related to each R&D activity to generate a linked information database in a linked information module for the R&D activities. Moreover, the method includes providing access to the linked information module by the one or more members.

Yet another embodiment of the invention provides a system for managing Research and Development (R&D) activities in an enterprise. The enterprise includes one or more sub-divisions and the one or more sub-divisions include one or more members. The system includes a knowledge capture module, a linked information module and an access module. The knowledge capture module is configured to capture research decision flow in the R&D activities. The research decision flow in the R&D activities is captured by receiving an objective of each R&D activity of the R&D activities. The objective is input by the one or more members. After receiving the objective, one or more requirements for fulfilling the objective of each R&D activity are received. The one or more requirements are determined by the one or more members. Thereafter, a set of risks associated with failure to satisfy the one or more requirements is received. The set of risks is identified by the one or more members. Thereafter, a set of tests are received to verify that one or more requirements are satisfied or one or more risks of the set of risks are mitigated. Finally, a task plan to satisfy the one or more requirements, mitigate one or more risks of the set of risks and conduct one or more tests of the set of tests is received to capture research decision flow in the R&D activities. The task plan is defined by the one or more members. Further, the knowledge capture module is also configured to capture a set of task information associated with one or more tasks performed by the one or more members, the one or more tasks being related to the R&D activities. The linked information module is configured to link the objective, the one or more requirements, the set of risks, the set of tests, the task plan and the set of task information related to each R&D activity. Lastly, the access module provides access to the linked information module to the one or more members.

Another embodiment of the invention provides a method of distributing R&D investments to different R&D projects. The method includes detailed metrics that are used to prioritize R&D projects for investments. These metrics enable organizations to allocate resources to R&D projects that are most likely to help them achieve strategic goals. One set of these metrics measure alignment of investments with the strategic weights. A further set of metrics enable organizations to identify and fund projects that have applicability to multiple products and hence produce a better return on R&D investments. Another set of metrics enable organizations to encourage reuse of R&D preformed in previous projects and hence reduce costs of delivering products to customers.

BRIEF DESCRIPTION OF DRAWINGS

The preferred embodiments of the invention will hereinafter be described in conjunction with the appended drawings, provided to illustrate and not to limit the invention, wherein like designations denote like elements, and in which.

DETAILED DESCRIPTION OF THE INVENTION

Figure 1:
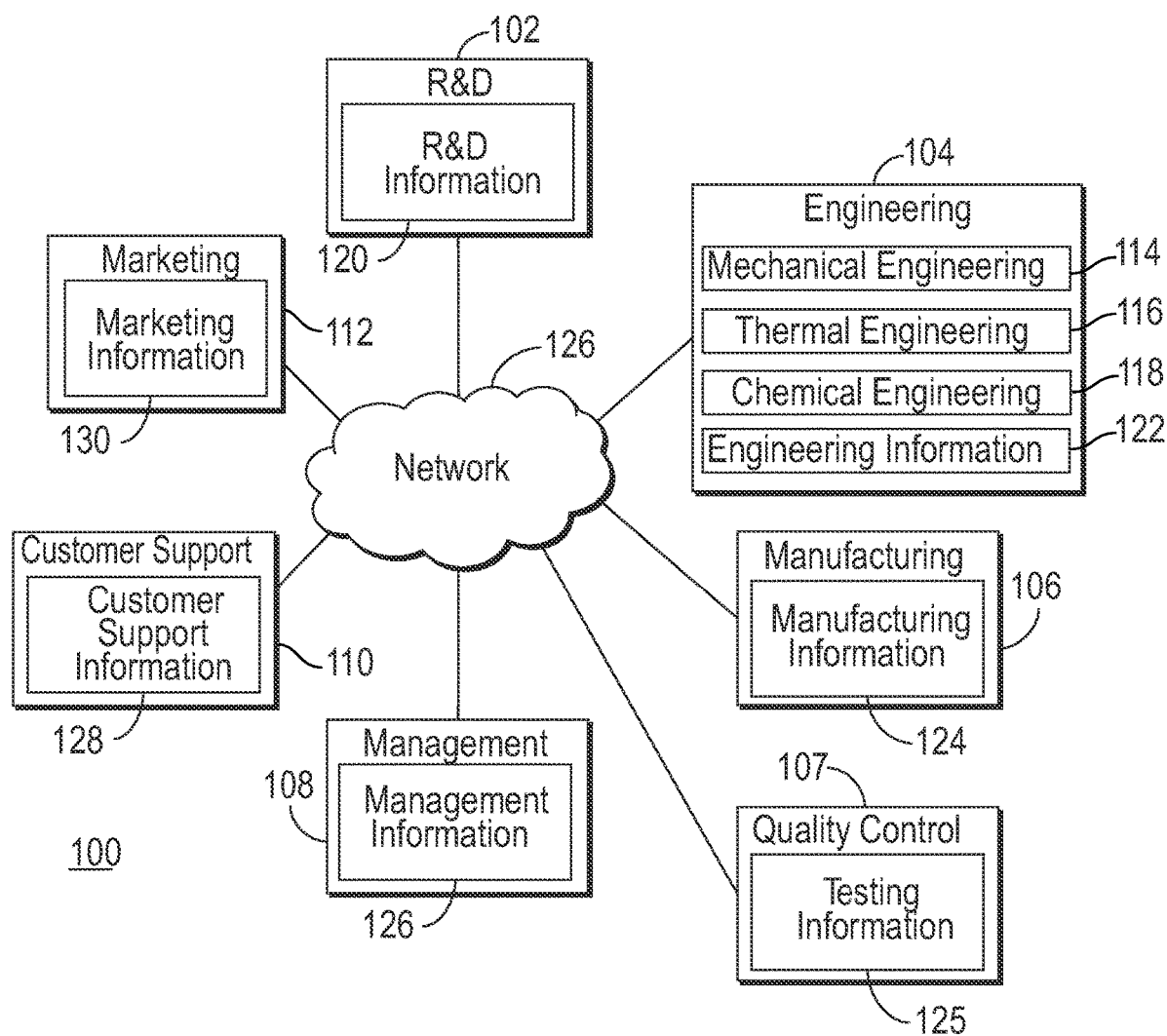
FIG. 1 illustrates an exemplary structure of an enterprise, in accordance with the prior art.

FIG. 1 illustrates an exemplary structure of an enterprise 100, in accordance with the prior art. The enterprise 100 is organized into various sub-divisions to facilitate functioning of the enterprise 100. For the purpose of this description, the enterprise 100 has been shown to include six divisions, which include an R&D Division 102, an engineering division 104, a manufacturing division 106, a quality control division 107, a management division 108, a customer support division 110, and a marketing division 112. These seven divisions will hereinafter be collectively referred to as the divisions 102-112. Each division is responsible for their specific functions in the enterprise 100. For example, the R&D division 102 handles all the research work and the manufacturing division 106 handles all the manufacturing and production work.

Further, each of the divisions 102-112 can have its own sub-divisions. For example, the engineering division 104 can have various sub-divisions such as a mechanical engineering sub-division 114, a thermal engineering sub-division 116, and a chemical engineering sub-division 118. Although sub-divisions of the engineering division 104 are shown in FIG. 1 for the sake of clarity, it will be apparent to those skilled in the art, that each of the divisions 102-112 can have its own sub-divisions.

While performing their respective roles, each of the divisions 102-112 generates a lot of information. This information is stored for record keeping and future reference. This information includes work-related documents, reports, communications, work plans & objectives, and the like. Typically, this information is maintained separately by each division. The R&D division 102 stores R&D information 120, the engineering division 104 stores the engineering information 122, the manufacturing division 106 stores manufacturing information 124, the quality control division stores inspection and testing information, the management division 108 stores management information 126, the customer support division 110 stores customer support information 128, and the marketing division stores the marketing information 130. Further, in an embodiment, various subdivisions of each of divisions 102-112 can also store its own information related to that subdivision. For example, the mechanical engineering sub-division 114 of the engineering division 104 can store information related to the mechanical engineering sub-division 114. In another embodiment, the divisions 102-112 can store information related to their respective sub-divisions. For example, the engineering division 104 can also store information related to the mechanical engineering sub-division 114, the thermal engineering sub-division 116, and the chemical engineering sub-division 118. In an embodiment, the information from the divisions 102-112 may be stored in a central server. However, even in this case, the purpose is only to store all information in one place. The information can still not be easily aggregated or accessed.

Aggregation of information from the divisions 102-112 is required to facilitate R&D work because even though their roles are different, their objectives are interlinked. Each division works towards the common objective of running and growing the enterprise 100. Hence, their operations also need to be in sync with each other so as to achieve the common objective. Further, sub-divisions of the divisions 102-112 may also need to be coordinated with each other. Furthermore, the divisions 102-112 may also be required to coordinate their work with the other sub-divisions of the divisions 102-112. An example of this can include the manufacturing division 106 performing manufacturing of product. To manufacture the product, the manufacturing division 106 needs to understand the various features about design of the product and possible knowledge of advantages and disadvantages of design. For this, the manufacturing division 106 needs to have access to the knowledge generated by the mechanical engineering sub-division 114. Another example can include the marketing division 112 performing a market survey to determine consumer preferences. In order to benefit from the insights from the survey, the products would need to be modified to meet the consumer preferences. To achieve this objective, R&D division 102 needs to access and understand the results of the survey and link them to their research objectives. Further, the R&D division 102 would need the help of the engineering division 104 and the manufacturing division 106 to evaluate the viability of coming out with the improved product. Hence, even though the R&D division performs only its respective function, very often it requires information and assistance from the other divisions.

Given this interdependence of the divisions 102-112, storing their respective information in separate un-integrated chunks results in a lot of inefficiency in the functioning of the enterprise 100. This inefficiency can be in the form of manual communication delays or incomplete information transfer resulting in time wastage and redundant effort. The divisions could also face difficulty in comprehending the transferred information due to use of technical jargon in the transferred information specific to each division.

Figure 2:
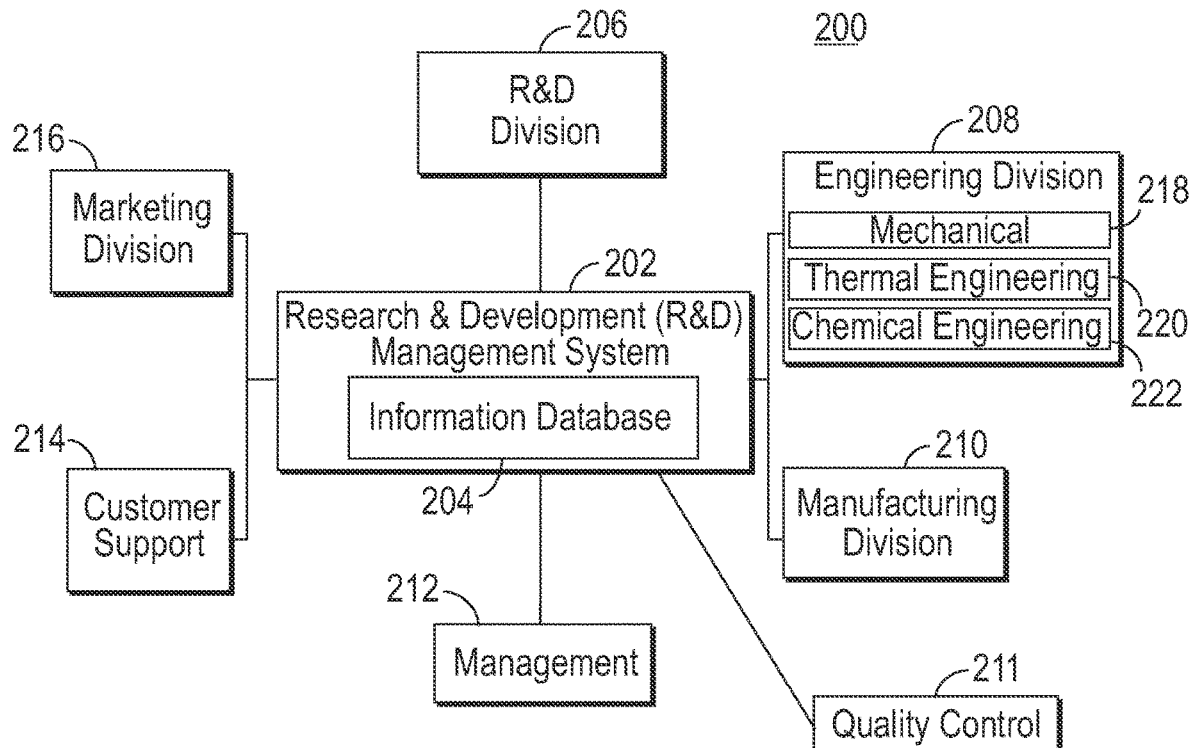
FIG. 2 illustrates an exemplary enterprise, where various embodiments of the present invention may be practiced.

FIG. 2 illustrates an exemplary enterprise 200, where various embodiments of the present invention may be practiced. The enterprise 200 is organized into various subdivisions to facilitate functioning of the enterprise 200. For the purpose of this description, the enterprise 200 has been shown to include six divisions which include an R&D Division 206, an engineering division 208, a manufacturing division 210, a quality control division 211, a management division 212, a customer support division 214, and a marketing division 216. These six divisions will hereinafter be collectively referred to as the divisions 206-216. Each division is responsible for their specific functions in the enterprise 200. Further, each of the divisions 202-216 can have its own sub-divisions. For example, the engineering division 208 can have various sub-divisions such as a mechanical engineering sub-division 218, a thermal engineering sub-division 220, and a chemical engineering sub-division 222. Although sub-divisions of the engineering division 208 are shown in FIG. 2 for the sake of clarity, it will be apparent to those skilled in the art that each of the divisions 206-216 can have its own sub-divisions.

The enterprise 200 also includes a Research and Development (R&D) management system 202. The R&D management system 202 helps manage all the R&D related activities in the enterprise 200. It includes an information database 204 that is used to store the information generated by the divisions 206-216 while performing their respective roles. The information database 204 stores all the information from the divisions 206-216 in an aggregated form. It is this aggregated information that is used by the R&D management system to organize and streamline the whole R&D effort in the enterprise 200 to make it more efficient. An example of such a usage can be planning R&D work based on aggregated information on all R&D activities currently going on in R&D division 206. Other examples can include distributing investment across various R&D activities based on their relative priorities to other divisions, monitoring progress of different R&D activities and accordingly modifying R&D planning schedules, and providing access to the information database 204 by the divisions 206-216 to enable accurate and efficient information transfer.

Figure 3:
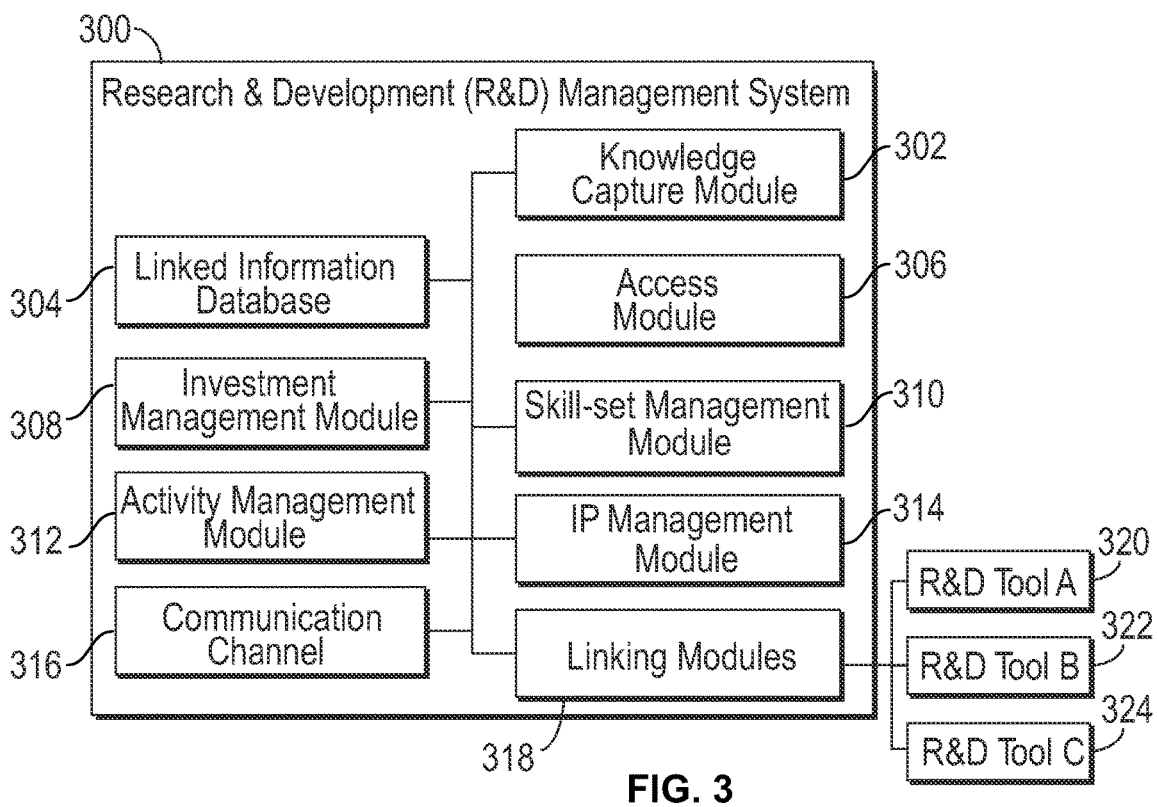
FIG. 3 illustrates a block diagram of a Research & Development (R&D) Management System, in accordance with an embodiment of the invention.

FIG. 3 illustrates a block diagram of a Research & Development (R&D) management system 300, in accordance with an embodiment of the invention. The R&D management system 300 is capable of managing R&D activities in an enterprise. The enterprise includes one or more divisions. Examples of the divisions include, but are not limited to, an R&D division, a research division, an engineering division, a manufacturing division, a technology division, a management division, a marketing division, and a customer service division. The one or more divisions include one or more members who are employees of the enterprise. In an embodiment, the R&D management system can be similar to the R&D management system 202 described in conjunction with FIG. 2.

The R&D management system 300 includes a knowledge capture module 302, a linked information module 304, and an access module 306. The knowledge capture module 302 is configured to capture research decision flow in the R&D activities. It captures the research decision flow by performing a series of steps. Firstly, the knowledge capture module 302 receives an objective of each R&D activity. Examples of the objective can include development of a new product such as an engine or a car, researching a new technology for example quantum computing or nanotechnology, modifying an existing product and the like. The objective is input by at least one of the one or more members from any of the divisions. For example, the objective could be input by a member from the marketing division based on market surveys, a member from the management division based on a newly adopted business strategy, or by a head of the R&D division based on his discussions with the heads of all the other divisions.

Next, the knowledge capture module 302 receives one or more requirements for fulfilling the objective of each R&D activity. The requirements include essentially two parts, all the sub-objectives required to be completed to achieve the objective and all the limitations that have to be met while meeting the objective. Examples of the requirements can include certain characteristics required in the new product such as fuel efficiency or safety. Another example of requirements can be based on modification specifications that need to be met by the modified products, such as the performance remaining the same while increasing the fuel efficiency or the safety standards being met while using lightweight materials to build the car. The one or more requirements are determined by at least one of the one or more members of the divisions. For example, the requirement could be a cost requirement determined and input by a member of the marketing division, or an international standards requirement determined and input by a member of the engineering division or by a member of the R&D division.

Thereafter, the knowledge capture module 302 receives a set of risks associated with failure to satisfy the one or more requirements. These risks are basically the points of concern or the possible loopholes to be kept in mind while working towards meeting the requirements. The set of risks can include risks such as the components being used to formulate a new cosmetics product could react to form a poisonous substance in the presence of water, welds used to fabricate a component in a machine could rupture beyond a certain speed of operation, and the like. The set of risks are also identified by at least one of the one or more members of the divisions. In some industries, such as software development, there is no significant need for risk assessment. In such cases, the knowledge capture module 302 does not receive any risks.

Thereafter, the knowledge capture module 302 receives a set of tests that verify that the requirements are satisfied or risks have been mitigated. These tests can include inspections during the manufacturing process or testing of various elements of the product. In industries such as software development, where there are no significant risks, the knowledge capture module only receives a set of tests that verify that the requirements are met.

Lastly, the knowledge capture module 302 receives a task plan to satisfy the one or more requirements, mitigate one or more risks of the set of risks and conduct one more tests. The task plan includes a list of tasks and sub-tasks and the schedule within which they have to be completed. For example, a task plan of development of a lightweight engine can have a list of tasks and sub-tasks such as researching lightweight materials for the engine, testing each material for temperature behavior and durability and selecting a material based on testing results, fabricating sample engines, and testing the sample engines for compliance with all of the one or more requirements. etc. The task plan is also defined by at least one of the one or more members of the divisions. Hence, by receiving and aggregating all the information regarding the objectives, requirements, risks and plans, the knowledge capture module 302 is able to capture the research decision flow. The process of capturing the research decision flow is described in detail in conjunction with the description of FIG. 4.

Further, the knowledge capture module 302 is also configured to capture a set of task information associated with one or more tasks performed by the one or more members. Each of the task information includes implementation details associated with a task of the list of tasks and sub-tasks of the task plan. For example, task information for development of a light-weight engine can include computer models of the engine and its parts, finite element analysis files for examining the engine and its parts, computer numerical control (CNC) machining files for building the engine, information on task performers, communications associated with the tasks, minutes of meetings related to the tasks, results and reports containing outputs of the tasks, and the like.

The linked information module 304 is configured to link the objective, the one or more requirements, the set of risks, the set of tests, the task plan, and the set of task information related to each R&D activity. The linked information module 304 includes a linked information database to store this information. Linking also involves interlinking each of objectives, requirements, risks, tests and plans to each other. For example, the risks related to each requirement are linked to it along with all information regarding the tasks in the plan directed towards meeting the requirement. Linking the information related to each R&D activity gives exhaustive sets of structured information for each R&D activity. These sets of structured information can be used to transfer knowledge relating to each R&D activity. This ensures accurate and complete knowledge transfer thus rendering the whole process of R&D more efficient. In one embodiment, the linked information database in the linked information module 304 can also include investment data, skill-set data, intellectual property data, and a set of communication data. Further, the linked information module 304 also includes data from the one or more divisions.

The linked information module 304 is also capable of overcoming the problem of different jargons being used across various divisions in the enterprise. This is achieved by providing a context of each decision. The context helps in understanding each decision since the context is highly objective in nature as opposed to subjective nature of context that may arise due to varying interpretation of jargon by members of different divisions. For example, in case of a light-weight engine, satisfactory structural integrity over the design life is a key design requirement. A structural engineer from the mechanical engineering sub-division 218 is normally responsible for ensuring the structural integrity. The structural integrity depends on material properties of the aluminum used for building the engine and pressure and temperature imposed upon it by combustion of fuel in the engine. The material properties in turn also depend on the temperature. A material scientist from the mechanical chemical engineering sub-division 218 222 is responsible for determining properties of the aluminum. A computational fluid dynamics (CFD) engineer from the chemical mechanical engineering sub-division 222 218 is normally responsible for estimating temperature and pressure generated by the combustion process. A thermal engineer from the thermal engineering sub-division 220 takes the results of the combustion process and material properties from the material scientist and the CFD engineer to develop a temperature profile. The structural engineer then combines the information from the material scientist, the CFD engineer and the thermal engineer in order to evaluate the life of the light-weight engine. Thus, it can be seen that the R&D process is complex. Further, the R&D process is interdependent. The temperature and pressures generated by the CFD engineer depend on material properties and thermal behavior of the engine. The thermal behavior in turn depends on the temperature, pressure and material properties. The combustion process is complex and can result in many different temperatures and pressures based on how long the engine has been running, how fast etc.

Historically, the exchange of information between all these engineers was through an exchange of values for different parameters necessary to build discipline-specific models. However, the rationale behind how a team member arrived at specific values was either lost because of jargon used in discipline-specific technical documents or was not captured at all. In the present example, the CFD engineer has to make several decisions about which temperature and pressure values are transferred to thermal and structural engineers. These decisions often have significant impact on work performed by other team members downstream and on overall design of the engine. Many times, not understanding this rationale leads to unnecessary cost being added to the product. Also, these decisions can have opposite impact on different disciplines. For example, a higher temperature may restrict cracks growth to improve overall engine life but may actually increase chances of a leak.

In an embodiment of the present invention, each engineer outlines requirements and risks that they are addressing in their evaluation. Since this information is embedded in an easy-to-understand jargon-free linked information record, each engineer is able to understand not only the values of parameters being provided to him, but also the rationale behind how those values were generated. Hence the thermal engineer can understand the drivers and rationale behind parameters and values he receives from the CFD engineer, while the CFD engineer can understand exactly how the thermal engineer is planning to use the temperature and pressure values he is receiving. Therefore, the linked information module 304 helps in mitigating the impact of jargon and facilitating a user in understanding the rationale (or context) of a decision, and results in development of more robust and cost-effective systems.

Further, in an embodiment, the context for each decision is provided by structuring the information into predefined data fields. Various kinds of data formats such as drop down lists with limited options, percentage values for progress, summary fields with word limits, etc can be used to make the data fields (the context) objective. Therefore, members of the enterprise can now represent their thoughts and work in fixed formats. This helps in reducing the complexity in the information. Further, since the amount of information is also reduced, in comparison with large documents that were traditionally used, it becomes very easy to comprehend the information and make better informed decisions. The linked information database in the linked information module 304 is also configured to store the linked information. In addition to the structured information, the linked information module 304 also provides means to store the work documents and data for record keeping purposes.

In one embodiment of the invention, the linked information module 304 is further configured to classify data in the linked information module 304 into one or more categories. Examples of the one or more categories include, but are not limited to, a product category, a technology category, and a skill-set category. The classification of data into the one or more categories facilitates easier extraction of information through organizing the data under various relevant categories. Hence, a person requiring a particular kind of information regarding multiple R&D activities can directly access it through the relevant categories. For example, a person wants to find out how many R&D activities are being worked on in the domain of material sciences. Then the person can directly access the technology category under which he will be able to see all current R&D activities in the domain of material sciences. In addition, he will also be able to see various details about each of these R&D activities such as progress, schedule, tasks, and the like.

It will be apparent to those skilled in the art that large R&D projects are divided into subprojects. For example, R&D of a new car can be divided into R&D of an engine, a chassis, etc. When R&D projects are subdivided into subprojects, the relationship between project and subproject is also stored in the linked information module 304. In another embodiment of the invention, it is possible to share or reuse sub-projects between different projects by creating a new link in linked information module 304. For example, an automotive manufacturing company can share an engine R&D subproject between R&D of a new car and a new truck. Further, such a link can be made between a technology project and a product project to transition the technology R&D into product R&D. For example, a technology project for developing a new metal can be transitioned into development of a new engine subproject of a project of R&D of a new car. It will also be apparent to those skilled in the art that each subproject can be classified using one or more subcategories of a parent project's category. For example, an R&D project for development of a new car and assigned the category of Family Cars can be divided into an engine R&D subproject with a subcategory of Small Engines. In another embodiment of the invention, the linked information module 304 is further configured to store the relationships between categories and their subcategories. Hence, the classification of data can be done at the overall product level or at a subcomponent level.

In one embodiment of the invention, the linked information database in the linked information module 304 can be updated with every action that is related to the R&D activity. Further, the linked information module 304 can be used for modifying at least one of the objective, the one or more requirements, the set of risks, set of tests, and the task plan. Such modifications will be required quite often as the insights obtained through analysis of the linked information will cause changes to occur in the original objectives, requirements, risks, tests and plans. For example, when the results of a material testing experiment stored in the linked information database in the linked information module 304 are seen by a manager in the R&D division, he decides to change the underlying requirement. Hence, the linked information module 304 maintains a very dynamic nature continuously being updated with any action related to the R&D activities.

In an embodiment of the invention, the job of linking the objective, the one or more requirements, the set of risks, the task plan, and the set of task information can also be performed by the knowledge capture module 302 only. The linked information database in the linked information module 304 can be used for only storing the linked information.

The access module 306 provides access to the linked information module 304 by the one or more members of the one or more divisions. This result in making the whole process of R&D management more efficient through providing the structured information to anyone and everyone who might need to refer to it for work purposes. Further, this structured information can be used by the one or more members for various purposes such as monitoring R&D activities, distributing investments among the R&D activities, modifying R&D activity plans, and various other purposes related to any aspect of the R&D activities.

In one embodiment of the invention, the access module 306 can implement an access control policy based on a role of a member in the enterprise. The access control policy authorizes members to perform various actions based on their roles in the enterprise. Examples of these actions include, but are not limited to, inputting the objective, determining the one or more requirements, identifying the set of risks, defining the task plan, performing the one or more tasks, and selectively accessing the linked information module 304 based on the role of the member. The access control policy is implemented to ensure that a member of the enterprise only has access to the information relevant to his/her role. This acts as a safeguard against misuse of the information in the linked information module 304.

In one embodiment, the R&D management system 300 can also include an investment management module 308 that is configured to distribute an investment between the R&D activities based on data related to each R&D activity in the linked information database in the linked information module 304. The investment management module 308 provides all information relevant for making investment decisions regarding the R&D activities. This relevant information can include effort estimates for each R&D activity, cost estimates for each R&D activity, progress of each R&D activity, and the like. The investment management module 308 is also capable of aggregating and organizing cost information into separate R&D activities if the costs are available for each task to be performed in the R&D activity. For example, the R&D division 206, the engineering division 208 and its sub-divisions 218-222, and the manufacturing division 210 can have cost information related to different tasks involved in R&D. These division can incur cost in various stages of development of the product, such as material selection/development of product (by the R&D division 206), design of product (by the mechanical engineering sub-division 218), thermal analysis and chemical testing (by the thermal engineering sub-division 220 and the chemical engineering sub-division 222), and manufacturing method development such as casting, powder metallurgy (by the manufacturing division 210) etc. The investment management module 308 can aggregate and organize cost information from these different categories. This aggregated information can be useful in many ways such as allocation of funds, estimating cost of a project (such as development of a new product in this example), utilization and requirement of funds across various divisions etc. In addition, the investment management module 308 can account for relative priorities of the R&D activities to distribute the investment available. In other words, the investment management module 308 can help managers understand planned investments in different product areas or technologies, and modify them to support strategic priorities of the organization or respond to changing needs of the organization.

In one embodiment, the R&D management system 300 can further include a skill-set management module 310. The skill-set management module 310 can be configured to collate data associated with a member of the one or more members from the linked information database in the linked information module 304. The collated data can be used for conducting the performance review of the member. This enables a very comprehensive performance review for a member of the enterprise as all information related to the work performed by the member is available on the linked information module 304. Hence, the sum total of all this information can be considered to be the best reflection of the work performed by the member in the enterprise. Further, this collated information can be provided to a set of members who are related to the work performed by this member. In one embodiment, the set of members can include managers for whom this member has worked, the peers with whom this member has worked, the reporting manager or sub-division manager for this member, and members from Human Resources (HR) division of the organization. In another embodiment, the set of members can include the project manager of this member and supervisor of this member. It will be apparent to those skilled in the art that the set of members will depend on the needs and policies of the organization. Further, performance reviews for a member can be obtained from members from each of these three categories i.e. the peers, the reporting manager/sub-division manager and members from HR division, and then combined to give the overall performance review of the member. The skill-set management module 308 also provides for the member to perform his/her self-review. This self-review can also be accounted for while combining the remaining reviews to obtain the overall performance review.

In another embodiment of the invention, the performance review that is conducted using the collated information is used as the basis for determining skills of the member. This skill information for each member is also stored in the linked information database in the linked information module 304. Further, the skill-set management module 308 can be configured to identify a member with a predetermined skill based on the overall performance review of the member. Thus, whenever there is a specific requirement for a person with a predetermined skill in the enterprise, the skill-set management module will enable efficient tracking of a suitable member across divisions, disciplines and geographic locations.

In one embodiment, the R&D management system 300 can also include an activity management module 312 that is configured to process data from the linked information module 304 related to an activity of the R&D activities in order to generate activity review data based on at least one predefined parameter associated with the activity. The activity review data can include tables, graphs and charts which can provide a summary of the information related to the activity. The activity management module 312 also provides a graphical user interface for displaying the activity review data to a member to facilitate review of the activity. Examples of the predefined parameter include, but are not limited to, a financial parameter, a progress parameter, a requirements parameter, and a risk parameter. Generating the activity review data with respect to specific parameters helps provide insights from the R&D activity related to that particular parameter. The activity review data can also be used to modify the linked information database in the linked information module 304. For example, on reviewing an activity using the activity review data generated for it by the activity management module 312, a member may determine the need to add or alter a requirement, a risk, or associated tasks. Hence, the member will modify the linked information database in the linked information module 304 accordingly.

In one embodiment, the R&D management system 300 can further include an Intellectual Property (IP) management module 314. The IP management module 314 is configured to generate intellectual property data associated with the R&D activities based on the set of task information regarding the one or more tasks. This intellectual property data primarily includes linked information records that are identified to be new research. These linked information records contain the outputs of the one or more tasks that were performed as part of the R&D activities at the enterprise. Hence, intellectual property data can be used to generate a set of intellectual property assets associated with the R&D activities. Examples of the intellectual property assets can include patents, research papers and the like. The intellectual property data can also be used to classify the set of intellectual property assets based on a set of predefined criteria. Examples of the classification include, but are not limited to, assets to be used in the enterprise's own products, assets to be sold to other firms, and assets that can be licensed out to other firms. Further, the classification can be based on predefined criteria such as the applicability of the asset to the enterprise's lines of business, the financial viability of using the asset in their own product, and potential for licensing the asset.

In one embodiment, the R&D management system 300 can also include a communication channel 316 that is configured to enable the one or more members to communicate regarding the one or more tasks associated with the R&D activities. The inclusion of the communication channel 316 into the R&D management system 300 facilitates the capture of a set of communication data associated with the one or more tasks performed by the one or more members. The communication channel 316 can include various means of communication such as emails, messengers, telephones, and meeting conversations, etc. Some of these means of communications such as telephones can be implemented with the advancement of voice recognition technology. Correspondingly, it also provides means for capturing each kind of communication such as electronic communication, telephonic communication, and verbal communication.

In one embodiment, the R&D management system 300 can further include linking modules 318. The linking modules 318 are configured to process data from a plurality of R&D tools used to perform the one or more tasks. The processed information is stored in the linked information database in the linked information module 304. For the purpose of this description, the linking modules 318 have been shown connected to three R&D tools, R&D tool A 320, R&D tool B 322, and R&D tool C 324, collectively referred to as R&D tools 320-324. Examples of the R&D tools 320-324 can include, but are not limited to, a simulation machine, a mechanical testing machine, an electronic testing machine, and the like. The information from the R&D tools 320-324 may need to be processed before storing in the linked information module 304 so as to make it compatible with the format used to store data in the linked information database in the linked information module 304.

Figure 4:
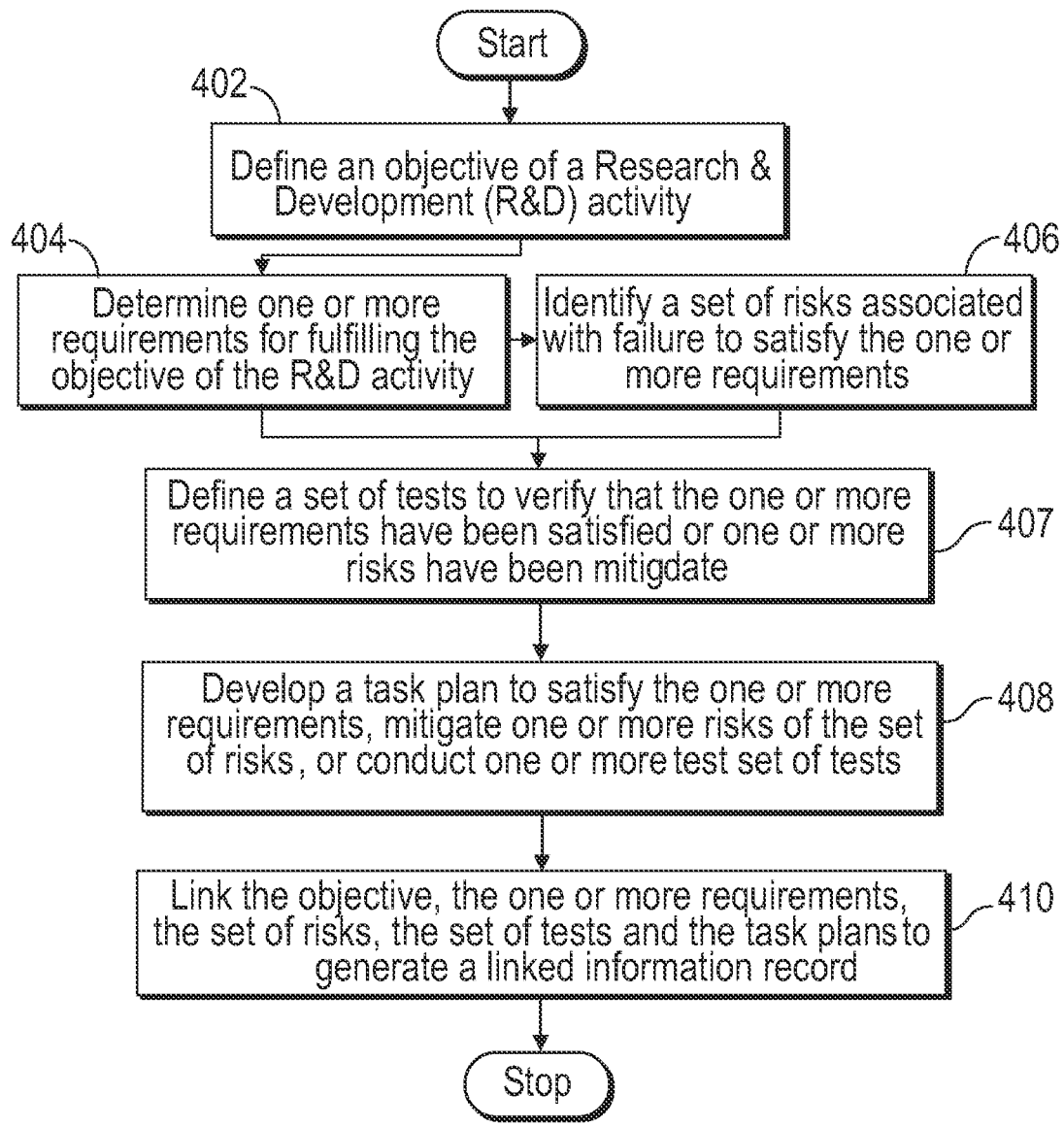
FIG. 4 is a flow diagram illustrating a method for capturing research decision flow in an R&D activity, in accordance with an embodiment of the invention.

FIG. 4 is a flow diagram illustrating a method for capturing research decision flow in an R&D activity, in accordance with an embodiment of the invention. The R&D activity is performed by a member in an enterprise. To describe the flow diagram, reference will be made to FIG. 3, although it should be understood that the flow diagram can be implemented in any other suitable environment or network. The method can be performed by the knowledge capture module 302.

At step 402, an objective of the R&D activity is defined for the R&D system 300. In one embodiment of the invention, the objective of the R&D activity is defined by the member. At step 404, one or more requirements are determined for fulfilling the objective of the R&D activity. At step 406, a set of risks are identified that are associated with failure to satisfy the one or more requirements. At step 407, a set of tests are identified that are associated with satisfying the one or more requirements or mitigating one or more risks of the set of risks. A task plan is developed to satisfy the one or more requirements at step 408. Further, the task plan can also mitigate one or more risks at step 408. Further, a task plan can also conduct one or more tests at step 408.

In industries such as software development, where there is no significant need for risk assessment, step 406 can be eliminated. In such industries, the step 407 can be modified to only identify tests that verify that the requirements are satisfied. The step 408 can be modified to only develop task plans to satisfy one or more requirements and develop a task plan to only test if requirements are satisfied.

At step 410, the objective, the one or more requirements, the set of risks, the set of tests and the task plan are linked to generate a linked information record. Although the flow diagram shows steps 402-410 sequentially, it will be apparent to those skilled in the art that these steps can occur asynchronously during R&D. For example, a team member may input a new requirement or update the one or more requirements determined at step 404 after task plan 408 has already been defined and R&D is in-progress. Further, as another example, a team member may discover a new risk 406 after the task plan 408 has been defined and R&D is in-progress.

The linked information record generated at step 410 is specific to the R&D activity being performed by the member. However, this method can be used to generate linked information records containing information regarding more than one R&D activity. Further, the linked information record can be used to understand the thought process behind the decisions made while performing the R&D activity. This is made possible through structuring every R&D activity into a logical structure made of objectives, requirements, risks and plans. Hence, through codifying all actions in this structure, the logic and understanding behind the decision can also be captured.

Let us take the example of an R&D activity that is directed towards designing a lightweight engine. Hence, the objective of the R&D activity is to design a low-cost lightweight engine. Based on this objective, a researcher will define requirements such as the engine material has to be lighter by 20%, engine cost cannot be greater than a threshold value, and the like. Thereafter, the researcher will identify what are the risks that could be faced in meeting these requirements, such as the durability of the engine might be compromised while picking a lightweight material, the material may become weak on being exposed to cycles of sudden temperature changes, and the like. Lastly, the researcher will define a task plan directed towards meeting all the requirements while ensuring that all risks are mitigated. An example of such a task plan can include following tasks in the order they are specified. First, find out lightweight materials to be considered as possible options. Then test each material for temperature behavior and durability. After selecting a material, design the engine block and other components. Lastly, fabricate sample engines and test the sample engines for fuel efficiency and other characteristics. The example stated above is only for illustration purposes and it will be apparent to those skilled in the art that the requirements and risks in R&D activity can be more complex than those illustrated above.

After defining the task plan, each of the tasks will be carried out and their results obtained. Now, based on these results, the R&D activity requirements, risks, tests and plans can be changed accordingly. For example, after having tested all materials, aluminum is chosen as the material for the engine. However, on fabricating and testing the engine, it is found that aluminum reacts with an additive in the fuel on combustion. Based on this observation, aluminum will be ruled out and another material will be chosen. Hence, if at a later date a person working on another new engine wonders why aluminum was not chosen for the previous engine, then the linked information record will provide the answer directly. Therefore, by capturing all the actions in this structure, we can understand the reasons behind each and every decision that was made regarding the R&D activity. In one embodiment of the invention, the linked information record can be updated with every action that is related to the R&D activity.

Figure 5:
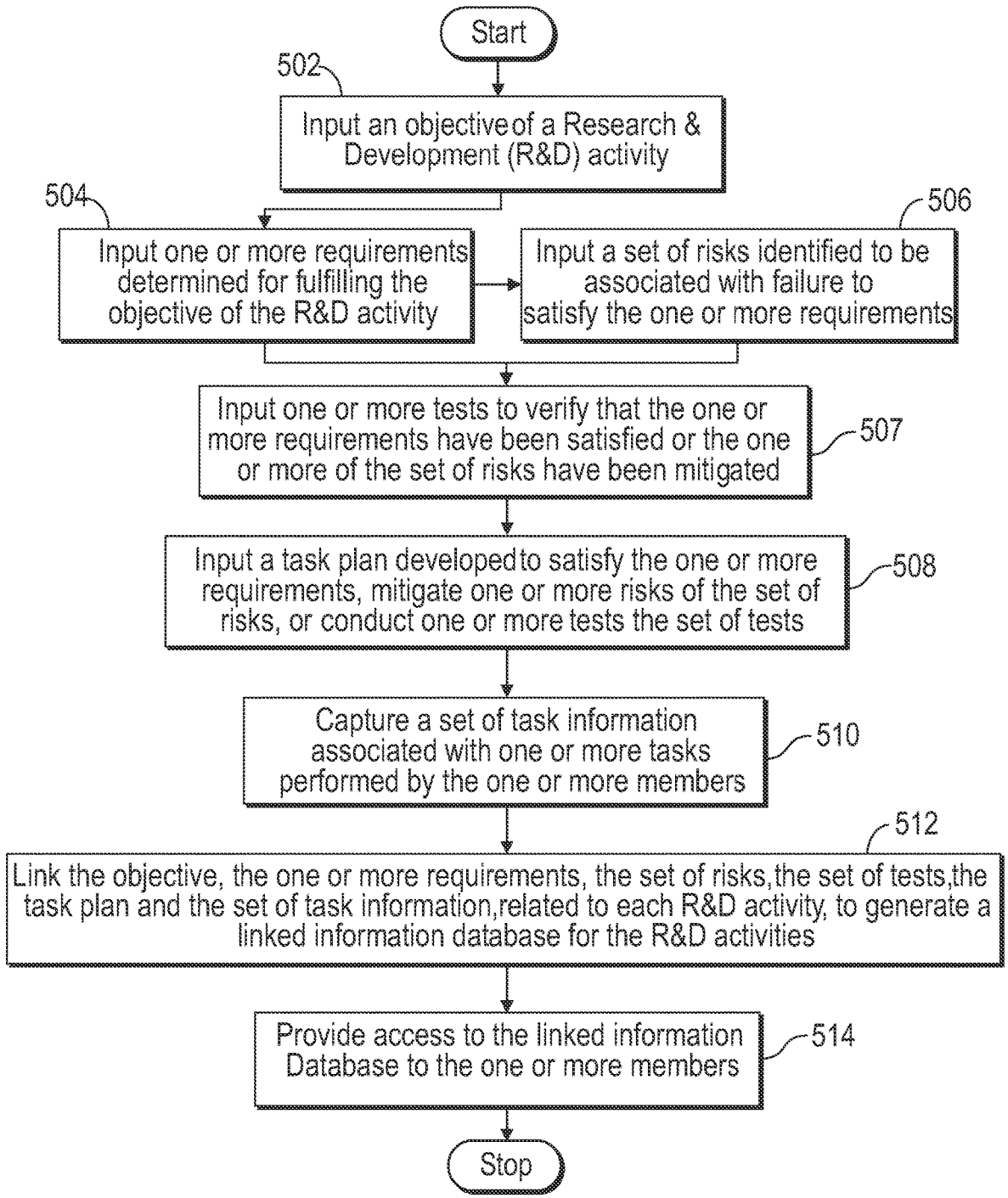
FIG. 5 is a flow diagram illustrating a method for managing R&D activities in an enterprise, in accordance with an embodiment of the invention.

FIG. 5 is a flow diagram illustrating a method for managing R&D activities in an enterprise, in accordance with an embodiment of the invention. The enterprise includes one or more divisions. Examples of the divisions include, but are not limited to, an R&D division, a research division, an engineering division, a manufacturing division, a technology division, a management division, a marketing division, and a customer service division. The one or more divisions include one or more members who are typically employees of the enterprise. To describe the flow diagram, reference will be made to FIG. 3, although it should be understood that the flow diagram can be implemented in any other suitable environment or network.

At step 502, an objective of each R&D activity of the R&D activities is defined. In one embodiment of the invention, the objective of each R&D activity can be input into the knowledge capture module 302 by at least one of the one or more members of the divisions. At step 504, one or more requirements for fulfilling the objective of each R&D activity are input into the capture module 302. In one embodiment of the invention, the one or more requirements can be determined by at least one of the one or more members of the divisions and then input into the knowledge capture module 302. At step 506, a set of risks associated with failure to satisfy the one or more requirements is input into the capture module 302. In one embodiment of the invention, the set of risks can be identified by at least one of the one or more members of the divisions. At step 507, a set of tests are defined to verify that the one or more requirements are satisfied or one or more of the set of risks are mitigated. In one embodiment of the invention, the set of tests can be defined by at least one of the one or more members of the divisions. Thereafter, at step 508, a task plan to satisfy the one or more requirements, mitigate one or more risks of the set of risks, or conduct one or more tests of the set of test is input into the capture module. In one embodiment, the task plan can be defined by at least one of the one or more members of the divisions. These steps 502-508 collectively form the process of capturing research decision flow in the R&D activities. The process of capturing the research decision flow is described in detail in conjunction with the description of FIG. 4.

At step 510, a set of task information is captured that is associated with one or more tasks performed by the one or more members. The one or more tasks are related to the R&D activities. In one embodiment, the set of task information can be captured by the knowledge capture module 302. Thereafter, at step 512, the objective, the one or more requirements, the set of risks, the task plan, and the set of task information related to each R&D activity are linked to generate a linked information database in a linked information module for the R&D activities. In one embodiment of the invention, the objective, the one or more requirements, the set of risks, the task plan and the set of task information can be linked by the knowledge capture module 302 and stored in the linked information database in the linked information module 304.

Lastly, at step 514, access to the linked information module 304 is provided to the one or more members. In one embodiment of the invention, access to the linked information module 304 can be provided by the access module 306. The access module 306 can implement an access control policy based on a role of a member in the enterprise.

Figure 6:
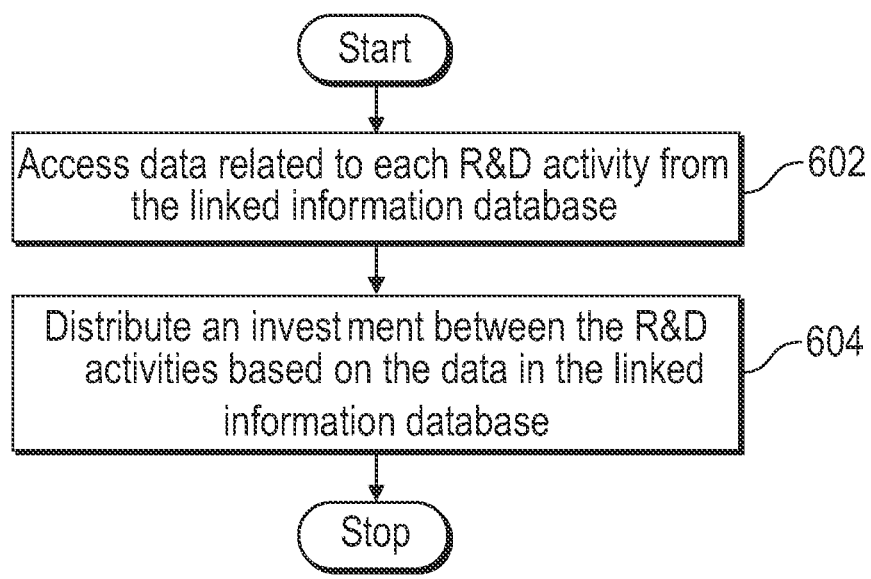
FIG. 6 is a flow diagram illustrating a method for managing investment on R&D activities in an enterprise, in accordance with an embodiment of the invention.

FIG. 6 is a flow diagram illustrating a method for managing investment on R&D activities in an enterprise, in accordance with an embodiment of the invention. To describe the flow diagram, reference will be made to FIG. 3, although it should be understood that the flow diagram can be implemented in any other suitable environment or network.

At step 602, data related to each R&D activity is accessed from the linked information database in the linked information module 304. In one embodiment of the invention, data related to each R&D activity can be accessed by the investment management module 308. At step 604, an investment is distributed between the R&D activities based on the data related to each R&D activity from the linked information module 304. In one embodiment of the invention, the investment can be distributed between the R&D activities by the investment management module 308. The functioning of the investment management module 308 is described in detail in conjunction with the description of FIG. 3.

Figure 7:
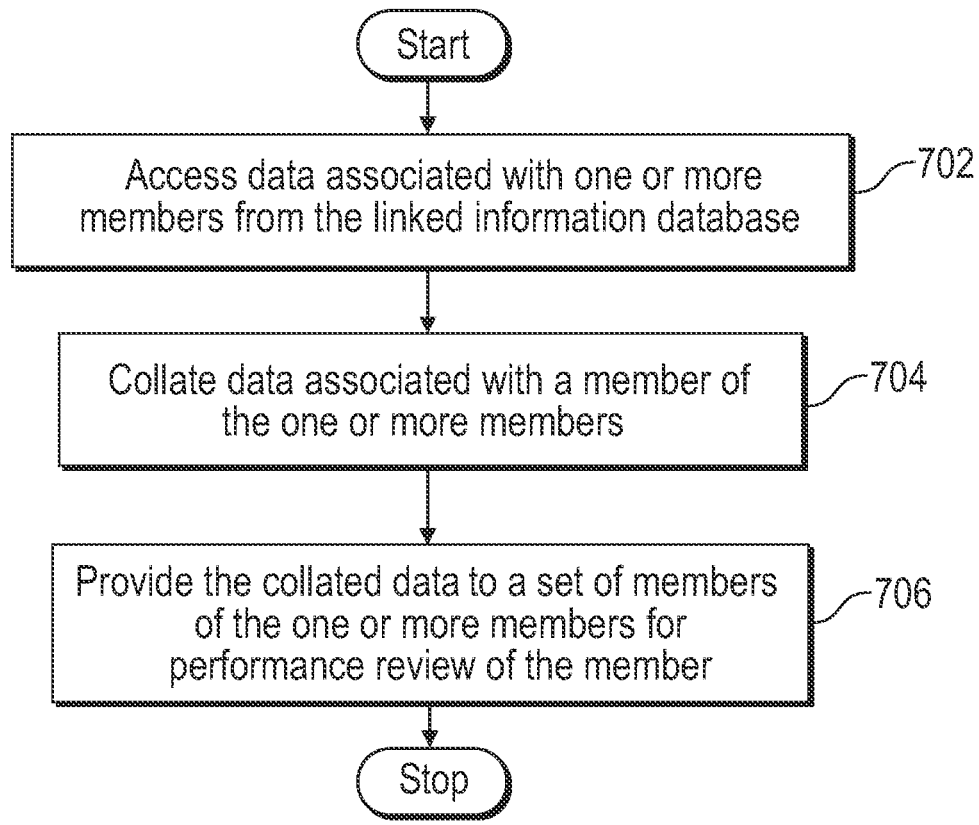
FIG. 7 is a flow diagram illustrating a method for performing a performance review of a member of an enterprise involved in R&D, in accordance with an embodiment of the invention.

FIG. 7 is a flow diagram illustrating a method for performing a performance review of a member of an enterprise involved in R&D, in accordance with an embodiment of the invention. To describe the flow diagram, reference will be made to FIG. 3, although it should be understood that the flow diagram can be implemented in any other suitable environment or network.

At step 702, data associated with one or more members of the enterprise is accessed from the linked information module 304. In one embodiment of the invention, data associated with one or more members of the enterprise can be accessed by the skill-set management module 310. At step 704, the data associated with the member of the one or more members is collated. In one embodiment of the invention, the data associated with the member of the one or more members can be collated by the skill-set management module 310. Thereafter, at step 706, the collated data is provided to a set of members of the one or more members for performance review of the member. In one embodiment of the invention, the collated data can be provided to a set of members by the skill-set management module 310. The set of members can include each member under whom the member being evaluated has worked and the members from at least one division of the one or more divisions. The functioning of the skill-set management module 310 is described in detail in conjunction with the description of FIG. 3.

Figure 8:
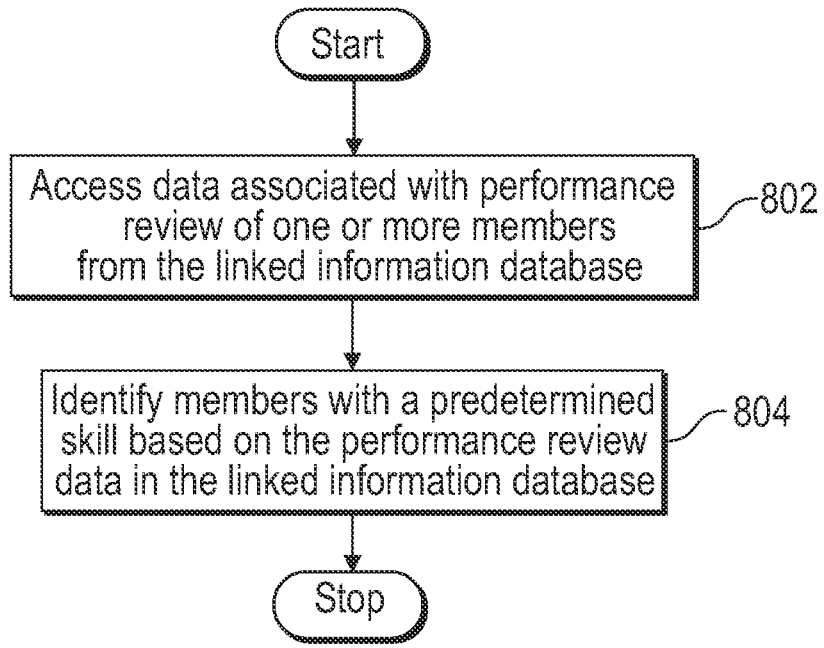
FIG. 8 is a flow diagram illustrating a method for locating a person with a predetermined skill, in accordance with an embodiment of the invention.

FIG. 8 is a flow diagram illustrating a method for locating a person with a predetermined skill, in accordance with an embodiment of the invention. To describe the flow diagram, reference will be made to FIG. 3, although it should be understood that the flow diagram can be implemented in any other suitable environment or network.

At step 802, data associated with performance review of one or more members is accessed from the linked information module 304. In one embodiment of the invention, data associated with performance review of one or more members can be accessed by the skill-set management module 310. At step 804, members with a predetermined skill are identified based on the performance review of the member.

In one embodiment of the invention, members with the predetermined skill can be identified by the skill-set management module 310. The functioning of the skill-set management module 310 is described in detail in conjunction with the description of FIG. 3.

Figure 9:
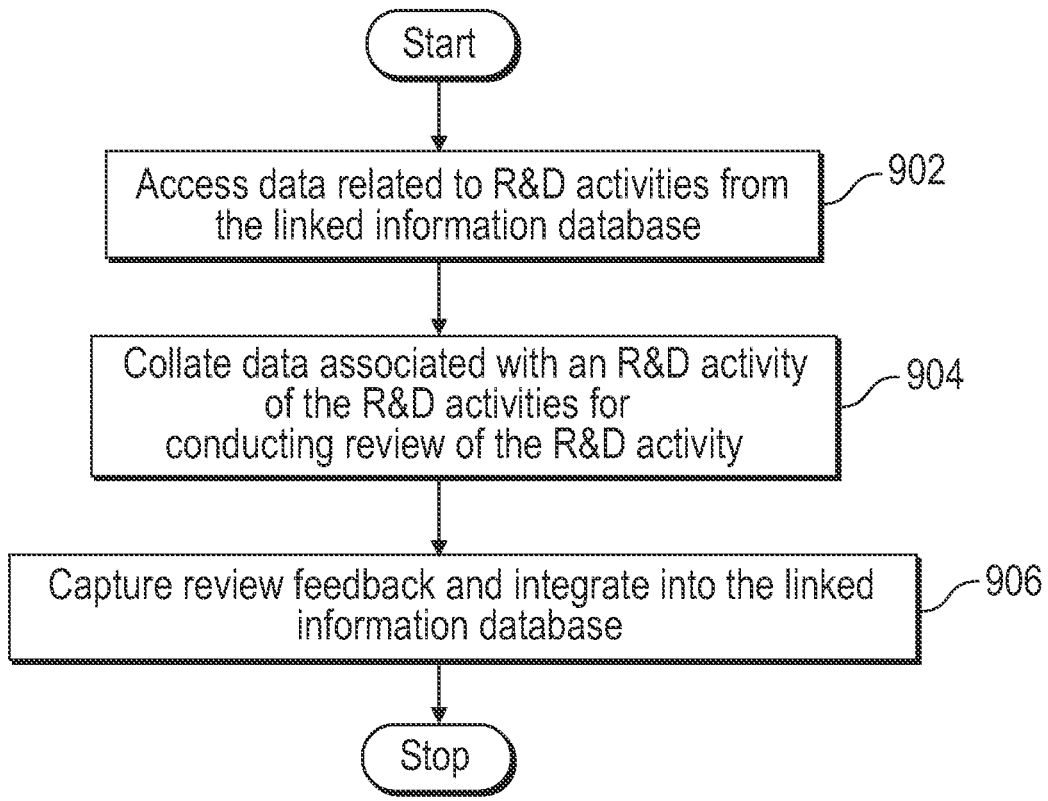
FIG. 9 is a flow diagram illustrating a method for performing a review for an R&D activity, in accordance with an embodiment of the invention.

FIG. 9 is a flow diagram illustrating a method for performing a review for an R&D activity, in accordance with an embodiment of the invention. To describe the flow diagram, reference will be made to FIG. 3, although it should be understood that the flow diagram can be implemented in any other suitable environment or network.

At step 902, data related to R&D activities is accessed from the linked information module 304. In one embodiment of the invention, data related to R&D activities can be accessed by the activity management module 312. At step 904, the data associated with an R&D activity of the R&D activities is collated for conducting reviews of the R&D activity. In one embodiment of the invention, the data associated with the R&D activity is collated by the activity management module 312. At step 906, feedback from the reviews is captured and incorporated into the linked information module 304. In one embodiment of the invention, the feedback is incorporated by the activity management module 312. The functioning of the activity management module 312 is described in detail in conjunction with description of FIG. 3.

Figure 10:
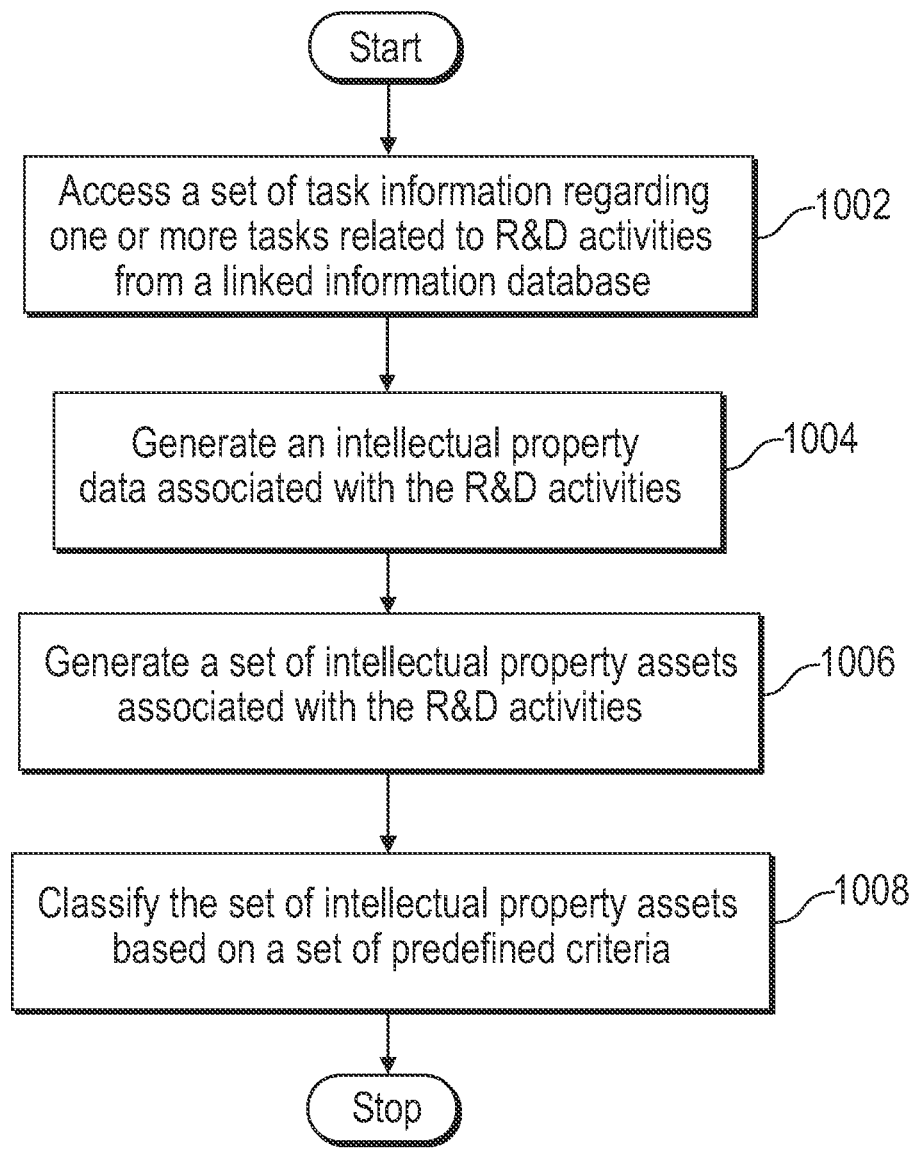
FIG. 10 is a flow diagram illustrating a method for managing intellectual property associated with R&D activities, in accordance with an embodiment of the invention.

FIG. 10 is a flow diagram illustrating a method for managing intellectual property associated with R&D activities, in accordance with an embodiment of the invention. To describe the flow diagram, reference will be made to FIG. 3, although it should be understood that the flow diagram can be implemented in any other suitable environment or network.

At step 1002, a set of task information regarding one or more tasks related to R&D activities is accessed from the linked information module 304. In one embodiment of the invention, the set of task information regarding the one or more tasks can be accessed by the Intellectual Property (IP) management module 314. At step 1004, intellectual property data associated with the R&D activities is generated. In one embodiment of the invention, the intellectual property data associated with the R&D activities can be generated by the IP management module 314.

At step 1006, a set of intellectual property assets associated with the R&D activities is generated. In one embodiment of the invention, the set of intellectual property assets can be generated by the IP management module 314. Thereafter, at step 1008, the set of intellectual property assets is classified based on a set of predefined criteria such as proximity with core line of business, implementation ease, contribution to brand value etc. In one embodiment of the invention, the set of predefined criteria can be classified by the IP management module 314. The functioning of the IP management module 314 is described in detail in conjunction with description of FIG. 3.

Figure 11:
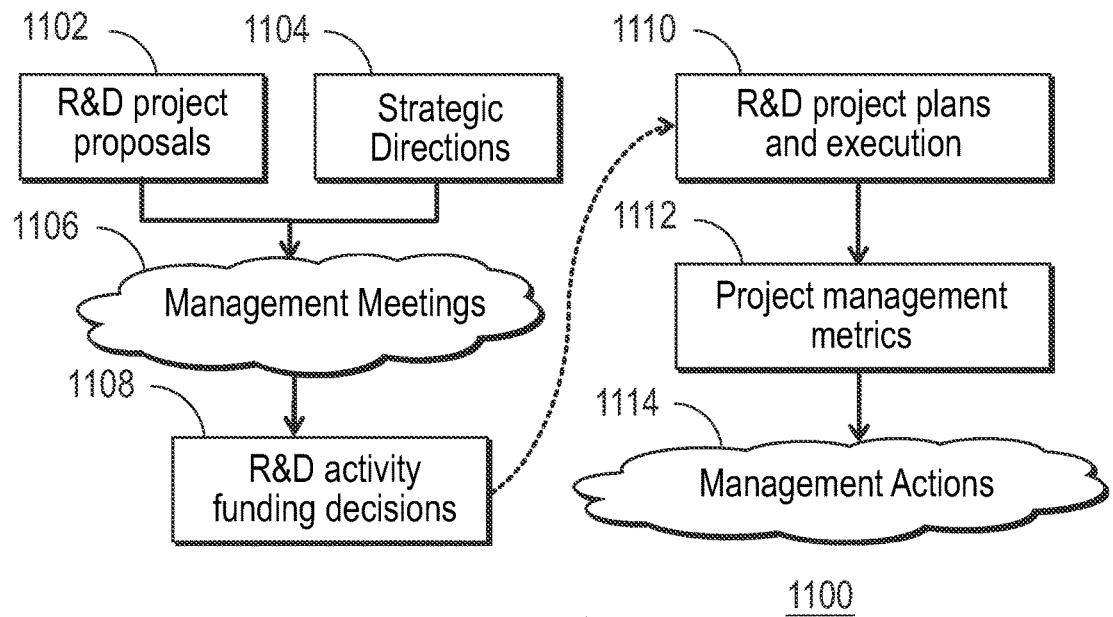
FIG. 11 illustrates an exemplary method for managing R&D, in accordance with the prior art.

FIG. 11 illustrates an exemplary method 1100 for allocating R&D investments in accordance with prior art. The method 1100 is divided into various steps to accomplish investment distribution. At step 1102, proposals are received requesting R&D investments to conduct new R&D projects. At step 1104, executives in the enterprise define strategic directions that guide R&D investments. At step 1106, management meetings are conducted that loosely translate Strategic Directions 1104 into R&D project funding decisions 1108. Once R&D projects are funded execution plans 1110 are developed and R&D execution commences. Project managers measure execution using standalone metrics 1112, which drives management actions 1114. Given the interdependencies between R&D projects and the complexity of products and technologies under development managers have little insight into the impact of their decisions. Since the information necessary to make decisions is distributed across multiple tools and processes.

Figure 12:
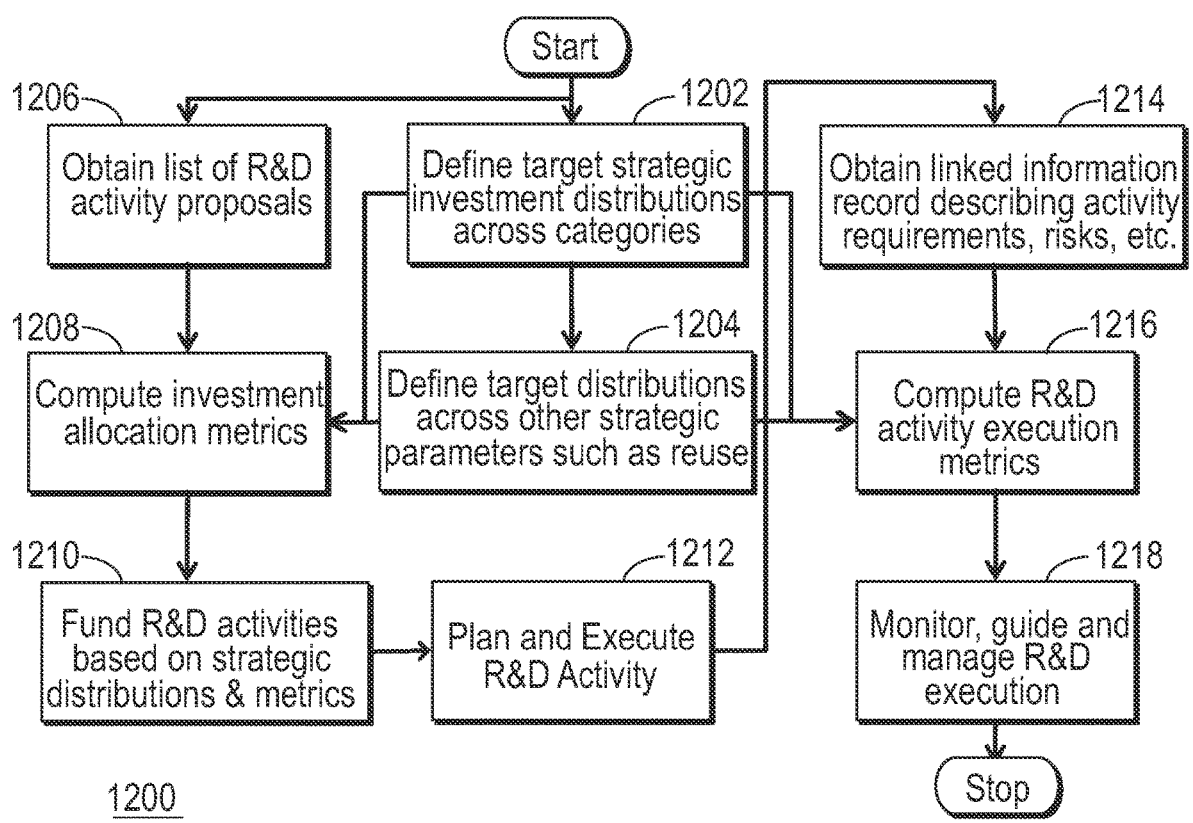
FIG. 12 is a flow diagram illustrating a method for managing R&D, in accordance with an embodiment of the invention.

FIG. 12 illustrates and exemplary method 1200 that utilizes the linked information database 304 to practice an embodiment of present invention 604. Leaders in an enterprise can express their strategic priorities in-terms of target strategic distributions for R&D investments, where targets are expressed as fraction of total R&D investments. At step 1202, leaders within the enterprise are asked to communicate strategic directions in terms of target distributions of investments between development of new products and technologies, and distribution across multiple categories defined in 304. Many methods such as surveys or interviews can be used to elicit these distributions and have been described extensively in the art.

At step 1204, enterprise leaders can also communicate strategic targets for other parameters such as design reuse or development slack. At step 1206, information about R&D project proposals is obtained from the database 304. At step 1208, investment allocation metrics are computed to help enterprises understand the actual distribution of R&D investment requests from project proposals across or R&D investments in completed projects for each strategic target.

In an embodiment of the invention, actual distribution for product R&D investments is computed by summing individual R&D project costs from database 304 which are assigned a product category or subcategory. For example, in an automotive company, the R&D costs can be summed across products such as Family Cars, Sports Cars, Trucks, etc. Or the costs can be summed for engines, transmissions, braking subsystems, etc. Similarly, the distribution for technology investments is computed by summing costs for projects that are assigned a technology or any other category. For example, in an automotive company, the R&D costs can be summed across technologies such as metals, electronics, etc. An Investment Alignment Index (IAI) for each category is computed by measuring the deviation between the actual investment distribution and target distribution defined by the executives. One approach for computing IAI is dividing the actual investment fraction by target investment fraction for each category and then summing these fractions over all related categories. Another approach for computing IAI is computing an average of absolute deviation from target or a variation from the target across categories. For examples, the actual distribution of R&D costs may be 33% each in Family Cars, Sports Cars and Trucks; while the executives can set the target as 25% each Family Cars and Sports Cars and 50% in Trucks. The IAI can be computed as 11.1%. At step 1210, enterprises can analyze IAI and take appropriate actions to fund R&D activities.

One of the key reasons for wasted effort in R&D is lack of synchronization between different elements of a product. If one component within a product is ready much earlier than others, more investment may be required to change the completed component because difficulties encountered during the R&D of the rest of the product. Another embodiment of the invention enables enterprises to eliminate such waste by computing an Investment Slack Index (ISI). The linked information database 304 contains relationships between projects and their subprojects. Another set of information that can be stored in 304 is the level of maturity of each subproject. In one embodiment of the invention, slack costs can be computed by summing costs of all subprojects that are at a higher level of maturity than the parent project. One approach for computing ISI is to divide slack costs by the total R&D costs. Another approach may be to divide the difference between slack costs and total costs by total costs. For example, in an automotive company, a project for R&D of a new car may have subprojects for R&D or engines and transmission. The maturity level of the overall car may be 2, but the engine may be at a maturity level of 3. In this case, the engine will be ready earlier than the rest of the car and may need to be changed completely depending on results of R&D of the transmission. If both subprojects cost $100,000 each and the total project costs are $300,000, the ISI can be computed as 100/300=33%. At step 1210, enterprises can compare ISI with targets determined by executives and take appropriate actions to fund R&D activities.

Another reason for wasted resources in R&D is lack of investment breadth: where the enterprise invests in R&D of only in some of the components necessary to get a new product to market. Another embodiment of the invention enables enterprises to eliminate such waste by computing an Investment Breadth Index (IBI). The linked information database 304 contains relationships between projects, their subprojects and related categories and subcategories. In one embodiment of the invention, breadth costs can be computed by identifying projects by each subcategory and summing corresponding costs. One approach for computing IBI is to compute the standard deviation of breadth costs across all subcategories of a category. Another approach for computing IBI may be the coefficient of variation of breadth costs across all subcategories of a category. For example, in an automotive company, a Family Cars category may have subcategories of Engines, Transmissions and Breaks. The sum of costs of all R&D projects for Engines, Transmissions and Breaks may be $1,000,000, $500,000 and $250,000 respectively. The IBI can be computed as coefficient of variation of ($1,000,000, $500,000 and $250,000)=65.4%. At step 1210, enterprises can compare IBI with targets determined by executives and take appropriate actions to fund R&D activities.

One approach enterprises use to improve R&D effectiveness is to fund development of components and technologies that benefit multiple products. Hence, many products gain benefit from the investment while the enterprise pays only once for the R&D. One embodiment of the invention enables enterprises to enhance R&D effectiveness by computing Design Reuse Index (DRI). The linked information database 304 contains information about R&D projects that reuse or share subprojects. In one embodiment of the invention, reuse costs can be computed by summing costs of subprojects every time they are reused or shared and adding the total R&D costs to the sum. One approach for computing DRI is to divide reuse costs by the total R&D costs. For example, in an automotive company, a Cars division may be developing and engine as a subproject (at a cost of $100,000) for a new car development project. A Trucks division may choose to use the car engine in a new truck product. Since the R&D of the engine is already covered by the Cars division, the development is essentially free for the new truck project. If the total R&D costs for the company are $1,000,000, reuse costs can be computed as $1,000,000+ $100,000 for reuse of the engine project. Hence, the DRI can be computed as $1,110,000/$1,000,000=110%. At step 1210, enterprises can compare DRI with targets determined by executives and take appropriate actions to fund R&D activities.

Technologies developed in enterprises have to be inserted into delivered products for enterprises to derive value from their technology investments. In many cases, technology development starts several years before product development. One embodiment of the invention computes Technology Insertion Index (TII) to enable enterprises to measure the planned insertions of technologies. The linked information database 304 contains information about technology R&D projects that have planned future insertion into products. In one embodiment of the invention, insertion costs can be computed by summing costs of all technology projects that have planned insertion. One approach for computing TII is to divide insertion costs by total R&D costs for all technology projects. For example, in an automotive company, a casting technology project for R&D of a development (a cost of $100,000), becomes accepted as part of a new engine R&D subproject or anew car project. If total technology R&D costs for the company are at $1,000,000, the TII can be computed as $100,000/$1,000,000=10%. At step 1210, enterprises can compare TII with targets determined by executives and take appropriate actions to fund R&D activities.

At step 1212, enterprises can plan and execute funded R&D activities and input related requirements, risks, tests or tasks into the Linked Information Database 304. At step 1214, the linked information records are obtained to compute R&D execution metrics (step 1216). Prior art shows computation of metrics such as cost performance index (CPI), schedule performance index (SPI), etc. However, most of these metrics are indicators of past performance, not a guide of future effort required. In another embodiment of the invention two metrics are computed that provide enterprises a better view into the progress of R&D projects.

In another embodiment of the invention, Objective Performance Index (OPI) is computed to measure how the R&D project is achieving its objectives. The linked information database 304 contains information about R&D projects objectives, requirements to fulfill those objectives and tasks undertaken to ensure requirements are satisfied. In one embodiment of the invention, objective performance for each objective can be computed by summing costs of tasks completed for each requirement. For partially completed tasks, objective performance can be computed by scaling the costs based on fraction work completed. OPI of a project can then be computed by aggregating objective performance across all objectives of a project. OPI for the all the R&D activities in an enterprise can be computed by aggregating their OPI. In another embodiment of the invention, OPI for each R&D project can be computed using a cost weighted average of OPI for each project objective. Similarly, OPI for all the R&D activities in an enterprise can be computed using a cost weighted average of all OPI for all R&D activities in an enterprise. At step 1218, enterprises can compare OPI with targets determined by executives and take appropriate actions to guide R&D activities.

In another embodiment of the invention, Risk Reduce Performance Index (RRPI) is computed to measure how the R&D project is mitigating its risks. The linked information database 304 contains information about R&D projects objectives, requirements to satisfy those objectives, risk that the requirements will not be satisfied and tasks undertaken to mitigate those risks. In one embodiment of the invention, risk reduction for each objective can be computed by summing costs of tasks completed for each risk. For partially completed tasks, risk reduction performance can be computed by scaling the costs based on fraction work completed. RRPI of a project can then be computed by aggregating risk reduction across all objectives of a project. RRPI for the all the R&D activities in an enterprise can be computed by aggregating their RRPI. In another embodiment of the invention, RRPI for each R&D project can be computed using a cost weighted average of RRPI for each project objective. Similarly, RRPI for all the R&D activities in an enterprise can be computed using a cost weighted average of RRPI for all R&D activities in an enterprise. At step 1218, enterprises can compare RRPI with targets determined by executives and take appropriate actions to guide R&D activities.

In another embodiment of the invention, Test Performance Index (TPI) is computed to measure how the R&D project is achieving its testing objectives. The linked information database 304 contains information about R&D projects objectives, requirements to fulfill those objectives, risks that requirements will not be satisfied, tests to verify that the requirements are satisfied and risks mitigated, and tasks undertaken to satisfy requirements, mitigate risks and conduct tests. In one embodiment of the invention, test performance for each objective can be computed by summing costs of tasks completed for each test. For partially completed tasks, test performance can be computed by scaling the costs based on fraction work completed. TPI of a project can then be computed by aggregating test performance across all objectives of a project. TPI for the all the R&D activities in an enterprise can be computed by aggregating their TPI. In another embodiment of the invention, TPI for each R&D project can be computed using a cost weighted average of TPI for each project objective. Similarly, TPI for all the R&D activities in an enterprise can be computed using a cost weighted average of all TPI for all R&D activities in an enterprise. At step 1218, enterprises can compare TPI with targets determined by executives and take appropriate actions to guide R&D activities.

Various embodiments of the invention provide a method and system for managing R&D activities in an enterprise. The method provides a technique to capture the research decision flow in the R&D activities and store it in the form of structured information. Therefore, the method enables the thought process and rationale involved in the R&D activity to be captured. Further, the method also overcomes the problem of different jargons used across different subdivisions through storing the information in objective data fields, thus reducing the complexity of the information.

Various embodiments of the invention provide a method for managing R&D activities in an enterprise which makes the whole process of R&D management more efficient, thus increasing the productivity of the R&D effort. The method also improves the overall visibility into the whole R&D process.

Various embodiments of the invention provide a system for managing R&D activities in an enterprise, which activities span across the divisions of the enterprise, and enables exhaustive data capture and effective sharing of information in the enterprise.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The computer system comprises a computer, an input device, and a display unit. The computer comprises a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and so forth. The storage device can also be other similar means for loading computer programs or other instructions on the computer system.

The computer system executes a set of instructions that are stored in at least one storage element to process input data. The storage elements may also hold data or other information, as desired, and may be an information source or physical memory element present in the processing machine.

The set of instructions may include various commands that instruct the processing machine to execute specific tasks such as the steps constituting the method of the present invention. The set of instructions may be in the form of a software program. The software may be in various forms such as system software or application software. Further, the software may be in the form of a collection of separate programs, a program module with a larger program, or a portion of a program module. The software may also include modular programming in the form of object-oriented programming. Processing of input data by the processing machine may be in response to user commands, to the results of previous processing, or to a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for capturing research decision flow in Research and Development (R&D) of a new product or technology, the method comprising:
   defining or modifying and capturing an objective of the R&D of the new product or technology in a dynamically linked information record;
   determining or modifying and capturing one or more requirements for fulfilling an objective of the new product or technology in the dynamically linked information record;
   defining or modifying and capturing a set of tests for verifying that the one or more requirements of the new product or technology are satisfied in the dynamically linked information record;
   developing or modifying and capturing in the dynamically linked information record a task plan to perform at least one of satisfying the one or more requirements and conducting one or more of the set of tests; and
   generating the dynamically linked information record in a computer system operatively connected to a storage device or arrangement of storage devices configured to capture a research decision flow.

2. The method recited in claim 1 further comprising:
   identifying or modifying and capturing a set of risks of failing to fulfil the one or more requirements of the new product or technology in the dynamically linked information record;
   defining or modifying and capturing an additional set of tests for verifying that the set of risks are mitigated in the dynamically linked information record;
   developing or modifying and capturing in the dynamically linked information record the task plan to perform at least one of mitigating one or more risks of the set of risks and conducting one or more of the additional set of tests, and generating the dynamically linked information record in the computer system.

3. The method as recited in claim 2 further comprising a method of computing risk reduction performance for each objective by summing costs of completed tasks for each its risk and by scaling and summing costs of partially completed tasks based on fraction work completed; and a method to compute risk reduction performance of a project by aggregating risk reduction performance across all objectives of the project and compute risk reduction performance for an enterprise by aggregating risk reduction performance of all R&D projects in the enterprise.

4. The method as recited in claim 1, wherein generating the dynamically linked information record in the computer system comprises the steps of:

dynamically linking and capturing the objective, the one or more requirements, the set of tests and the task plan from research decision flow, to generate a linked information record (LIR);

updating the LIR if needed;

linking other LIR's if needed;

performing the method asynchronously;

identifying a set of risks of failing to satisfy the one or more requirements;

defining an additional set of tests to verify that the one or more of the set of risks have been mitigated;

developing a task plan to perform at least one of mitigating one or more risks of the set of risks and conducting one or more tests of the additional set of tests; and dynamically linking and capturing the set of risks and the task plan from research decision flow, to generate the LIR in the computer system.

5. The method as recited in claim 4 further comprising the steps of:

classifying data in the LIR into one or more categories, wherein the one or more categories are selected from the group consisting of a product category, a technology category, and a skill-set category;

distributing an investment between the R&D of the new product or technology based on data related to each R&D of the new product or technology in the LIR: and collating data associated with a member of an enterprise associated with the LIR, wherein collated data is used for a performance review of the member;

providing the collated data to a set of members of the enterprise; and identifying a member with a predetermined skill based on the performance review of the member.

6. The method as recited in claim 1 further comprising collating data associated with the R&D of the new product or technology from a linked information record, wherein collated data is used for conducting a review of the R&D of the new product or technology.

7. The method as recited in claim 1 further comprising implementing an access control policy based on a role of a member in an enterprise to authorize the member to perform at least one step selected from the group consisting of inputting the objective, determining one or more requirements, identifying a set of risks, defining the set of tests, defining the task plan, performing one or more tasks; and selectively accessing the dynamically linked information record based on the role of the member.

8. The method as recited in claim 1 further comprising generating intellectual property data associated with the R&D of the new product or technology based on a set of task information regarding one or more tasks, wherein the intellectual property data is used for at least one of: generating a set of intellectual property assets associated with the R&D of the new product or technology and classifying the set of intellectual property assets based on a set of predefined criteria.

9. The method as recited in claim 1, wherein the dynamically linked information record comprises a plurality of predefined data fields to store data.

10. The method as recited in claim 1 further comprising a method of computing objective performance for each objective by summing costs of completed tasks for each its requirement and by scaling and summing the costs of partially completed tasks based on fraction work completed.

11. The method as recited in claim 1 further comprising of a method to compute the objective performance of a project by aggregating objective performance across all objectives of the project and compute the objective performance for an enterprise by aggregating objective performance of all R&D projects in the enterprise.

12. The method as recited in claim 1 further comprising a method of computing test performance for each objective by summing costs of completed tasks for each its test and by scaling and summing costs of partially completed tasks based on fraction work completed; and a method to compute test performance of a project by aggregating test performance across all objectives of the project and compute the risk reduction performance for an enterprise by aggregating risk reduction performance of all R&D projects in the enterprise.

13. A system for managing Research and Development (R&D) of a new product or technology in an enterprise, the enterprise comprising one or more divisions, the one or more divisions comprising one or more members, the system comprising:

a knowledge capture module, operatively connected to a computer system, and configured to store data and further configured to:

capture research decision flow in the R&D of the new product or technology by: receiving an objective of each R&D of the new product or technology, wherein the objective is input by the one or more members;

receive one or more requirements for fulfilling the objective of each R&D of the new product or technology, wherein the one or more requirements are determined by the one or more members;

receive a set of tests defined to verify that the one or more requirements are satisfied or one or more of a set of risks are mitigated;

receive a task plan, wherein the task plan is developed to perform at least one of satisfying the one or more requirements and conducting one or more tests or the set of tests, wherein the task plan is defined by the one or more members; and capture a set of task information associated with one or more tasks performed by the one or more members, wherein the one or more tasks are related to the R&D of the new product or technology;

a linked information module, operatively connected to the knowledge capture module, configured to dynamically link the objective, the one or more requirements, the set of risks, the task plan and the set of task information related to each R&D of the new product or technology; and an access module, operatively connected to the knowledge capture module and the linked information module, for providing access to the linked information module to the one or more members, wherein the one or more members can alter information in the linked information module by inputting or modifying any of the data stored in the knowledge capture module.

14. The system as recited in claim 13 wherein the knowledge capture module is further configured to:

receive a set of risks identified to be of failing to satisfy the one or more requirements, wherein the set of risks is identified by the one or more members;

receive an additional set of tests for verifying that the set of risks are mitigated in a dynamically linked information record; and receive the task plan, wherein the task plan is developed to mitigate one or more risks of the set of risks.

15. The system as recited in claim 13 further comprising an investment management module configured to distribute an investment between the R&D of the new product or technology based on data related to each R&D of the new product or technology in a linked information database in the linked information module;

an activity management module, operatively connected to the knowledge capture module, the linked information module, and the access module, configured to process data from the linked information module related to an activity of each R&D of the new product or technology to generate an activity review data based on at least one predefined parameter associated with the new product or technology;

wherein the linked information database in the linked information module is modified based on the activity review data; and one or more linking modules configured to process data from a plurality of R&D tools used to perform the one or more tasks, wherein the processed data is stored in the linked information database in the linked information module.

16. The system as recited in claim 13 further comprising a skill-set management module, operatively connected to the knowledge capture module, the linked information module, and the access module, configured to:

collate data associated with a member of the one or more members from the linked information module, wherein the collated data is used for a performance review of the member; and identify a member with a predetermined skill based on the performance review of the member.

17. The system as recited in claim 13, further comprising a communication channel configured to enable the one or more members to communicate regarding the one or more tasks related with each R&D of the new product or technology; and an intellectual property management module, operatively connected to the knowledge capture module, the linked information module, and the access module, configured to generate an intellectual property data associated with each R&D of the new product or technology based on the set of task information associated with the one or more tasks, wherein the intellectual property data is used for at least one of:

generating a set of intellectual property assets associated with the R&D of the new product or technology; and classifying the set of intellectual property assets based on a set of predefined criteria.

18. The system as recited in claim 13, wherein the data stored in the knowledge capture module further comprises feedback data generated from reviews of the linked information module linked to the research decision flow in the R&D of the new product or technology.

19. An article for capturing research decision flow in research and development (R&D) of a new product or technology, comprising:

one or more tangible, non-transitory computer-readable media; and means in the one or more media for receiving one or more objectives of R&D on a product or technology;

means in the one or more media for receiving one or more requirements, wherein the one or more requirements are limitations that must be met to fulfil the one or more objectives;

means in the one or more media for receiving a set of tests verifying that the one or more requirements are satisfied;

means in the one or more media for receiving a task plan, wherein the task plan further comprises tasks associated with satisfying the one or more requirements and conducting one or more of the set of tests;

means in the one or more media for dynamically linking the one or more objectives, the one or more requirements, the set of tasks and the task plan to generate a linked information database in a linked information module for the R&D; and means in the one or more media for providing access to the linked information module for updating the one or more objectives, the one or more requirements, the set of tests, or the tasks.

20. The article of claim 19, further comprising:

means in the one or more media for inputting a set of risks, wherein the set of risks are identified to be of failing to satisfy the one or more requirements; and wherein the set of tests further verifies that one or more of the set of risks are mitigated and the task plan is further associated with mitigating one or more risks of the set of risks.

* * * * *